Oct. 17, 1950     L. A. MEDLAR     2,526,251
THERMALLY RESPONSIVE IMPEDANCE UNIT
Filed Jan. 10, 1950
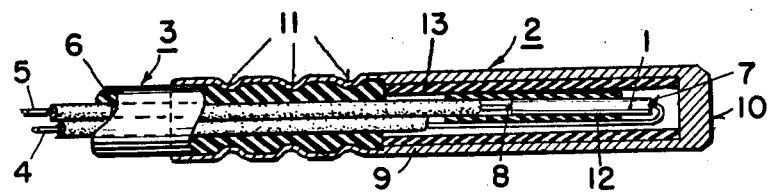
FIG. 1
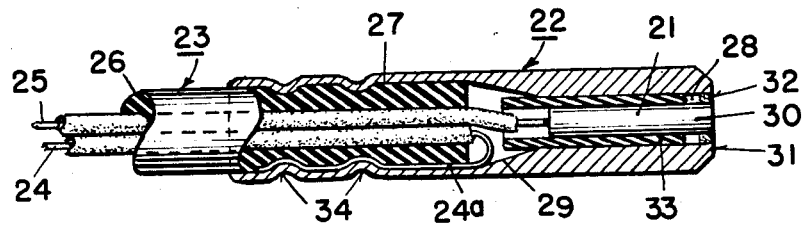
FIG. 2
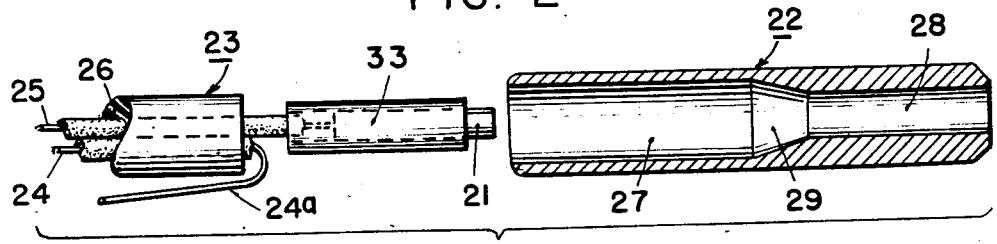
FIG. 3
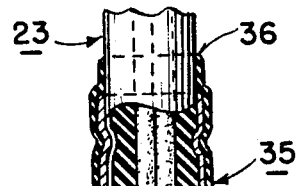
FIG. 4
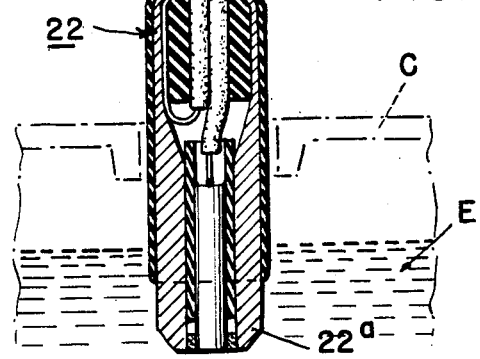
Inventor:
LEWIS A. MEDLAR,
By Stone, Boyden & Mack,
Attorneys Patented Oct. 17, 1950

2,526,251

UNITED STATES PATENT OFFICE 2,526,251

THERMALLY RESPONSIVE IMPEDANCE UNIT

Lewis A. Medlar, Oreland, Pa., assignor to Fox Products Company, Philadelphia, Pa., a corporation of Pennsylvania Application January 10, 1950, Serial No. 137,804

5 Claims. (Cl. 201—63)

1

This invention relates to thermally responsive impedance units, and more particularly to thermistor units adapted to be inserted through the filling opening of a storage battery to detect the internal temperature of the battery. The present application is a continuation in part of application Serial Number 87,494, filed April 14, 1949, by Lewis A. Medlar and James B. Godshalk.

As disposed in that applicaiton, battery chargers may be automatically controlled, in response to the internal temperature of the battery being charged, by employing a thermistor of the battery to regulate the internal temperature of the battery to regulate a relay circuit arranged to make and break the charging circuit in response to changes in resistance of the thermistor. In such a device, the relay or control circuit is located within the main casing of the battery charger, and the thermistor is connected to the control circuit by means of an insulated cable, so that the thermistor may be inserted through the filling opening of a battery which is somewhat removed from the charger casing. The thermistor must be protected from mechanical shock by a suitable casing secured to the end of the cable, and it is to the combination of thermistor, cable and casing that the present invention specifically relates.

An object of the invention is to devise a thermally responsive resistance unit constructed for insertion through a storage battery filling opening and providing optimum transfer of heat to the thermally responsive resistance.

A further object of the invention is to provide a thermally responsive unit comprising a rod-like thermistor of relatively small diameter, and a novel protective casing arrangement therefor, wherein the thermistor is so arranged as to be capable of withstanding severe mechanical shocks.

A still further object of the invention is to provide a thermally responsive unit comprising a rod-like thermistor electrically connected to the conductors of a two-conductor cable and secured within a protective casing, said casing having a novel configuration specially adapting the unit for ease of assembly.

Yet another object of the invention is to devise a thermally responsive resistance unit constructed for insertion through a storage battery filling opening and providing for optimum transfer of heat from the interior of the battery to the thermally responsive resistance but minimizing the effect upon the resistance of the temperature condition outside of the battery casing.

In order that the foregoing and other novel

2 features of the invention may be readily understood, reference is had to the accompanying drawings forming a part of this specification and in which:

Fig. 1 is a longitudinal section through a thermally responsive resistance unit constructed in accordance with one embodiment of the invention, parts thereof being shown in elevation;

Fig. 2 is a longitudinal section through a thermally responsive resistance unit constructed in accordance with a second embodiment of the invention, parts thereof being shown in elevation;

Fig. 3 is a view partly in side elevation and partly in longitudinal section, showing the device of Fig. 2 with the parts separated, illustrating the manner in which the device is assembled, and Fig. 4 is a longitudinal section through a thermally responsive resistance unit similar to that shown in Fig. 2, but including an exterior sheath of insulating material.

Referring now to the drawings, and first to Fig. 1 thereof, it will be seen that the embodiment of the invention shown in this figure includes a generally rod-like thermistor 1, a tubular casing 2 and a two-conductor flexible electric cable 3. The cable 3 includes conductors 4 and 5 and a relatively thick insulating sheath 6, the insulating sheath being trimmed well back from the ends of the conductors 4 and 5, and the conductors being bared and staggered for connection to the thermistor 1. Conductor 4 is soldered to one end of the thermistor 1 at 7, and conductor 5 is soldered to the opposite end of the thermistor at 8, the cable thus being adapted for connecting the thermistor to a suitable relay control circuit, as is fully described in the aforementioned application, Serial No. 87,494.

The casing 2, which is of good heat conducting material, consists of a tubular portion 9 and a closed end 10 which is substantially thicker than the wall of the main portion 9. The open end of the casing 2 is secured over the end of the insulating sheath 6 of cable 3, and this connection is made fluid-tight, as by crimping the wall of the casing at 11. The length of the casing 2 is such that, when the casing is secured to the cable, the thermistor 1 extends close to the relatively thick end wall 10 of the casing. An insulating sleeve 12 covers the bared portion of conductor 5 and most of the length of thermistor 1. An insulating tube 13 is provided to prevent contact between the exposed portion of thermistor 1 and the casing 2, and this insulating tube preferably extends from the end of the insulating sheath 6 of cable 3 to the end wall 10 of casing 2.

It will be seen that, in this embodiment of the invention, the thermistor 1 is supported substantially entirely by the conductors 4 and 5 and is completely insulated electrically from the casing 2. The thermistor 1 is preferably of that general type prepared by molding and firing mixtures of semi-conductive oxides of such metals as manganese, nickel, cobalt and copper, usually with a binder such as sodium silicate.

The casing 2, which preferably is made of lead-plated bronze, is so proportioned that its diameter is considerably smaller than the filling opening of a standard storage battery. When the unit is inserted through the battery filling opening, a portion of the casing, including the relatively thick end 10 thereof, will be in contact with the battery electrolyte, and the temperature of the electrolyte can thus readily be sensed by the thermistor 1 because of the good heat conducting path provided by the end wall 10. Since the cable 3, in actual practice, extends freely from the main casing of the battery charger to be controlled by the thermistor, the thermistor unit is subjected to relatively severe mechanical shocks during movement of the charger. But, since the thermistor is supported substantially entirely by the wires 4 and 5, such shocks are taken up by the wires.

A second embodiment of the invention is illustrated in Fig. 2, and again includes a generally rodlike thermistor 21, a tubular casing 22 and a flexible cable 23 comprising conductors 24 and 25 and a relatively thick insulating sheath 26. The casing 22 is provided with a central bore comprising a portion 28 of a diameter slightly larger than the outside diameter of the thermistor 21, a portion 27 of a diameter substantially larger than that of the portion 28, and a tapered portion 29 connecting the portions 27 and 28. The thermistor 21 is located within portion 28 of the bore and is positioned with its end 30 even with end 31 of the casing. The thermistor is supported substantially concentrically within the bore of the casing and is connected to the casing at the end 30 of the thermistor by a solder joint 32. The opposite end of the thermistor is connected to conductor 25 of cable 23, and a tube 33 of insulating material is provided between the thermistor and portion 28 of the bore of the casing, this insulating tube extending over most of the length of the thermistor.

The conductor 24 terminates in a bared portion 24a bent back over the insulating sheath 26 of cable 23. Portion 27 of the bore of casing 22 is positioned over the end of the cable 23, so that the bared portion 24a of conductor 24 is disposed between the outer surface of the insulating sheath 26 and the inner surface of the casing. The wall of the casing is crimped, as at 34, this crimping serving the dual functions of making the joint between the casing and the cable fluid-tight and assuring good electrical contact between the bared portion 24a of conductor 24 and the casing. Since the solder joint 32 seals the opposite end of the tubular casing, entrance of fluid to the interior of the casing is prevented.

The thermistor unit just described provides a continuous electrical path comprising conductor 25, thermistor 21, solder joint 32, casing 22, which is again preferably made from lead plated bronze, and conductor 24. The thermistor 21 may thus be connected to a suitable relay control circuit by the two conductors of cable 23, as is fully described in the aforementioned application, Serial Number 87,494.

Fig. 3 illustrates the manner in which the structure just described is adapted for assembly with a minimum of manual operations. The outer insulation of cable 23 is first stripped down to free the end of conductors 24 and 25, which are then bared for a distance as shown. One end of thermistor 21 is then soldered to the end of conductor 25, and insulating sleeve 33 is slipped into place to cover a major part of the length of the thermistor and also the bared portion of conductor 25. Bared portion 24a of conductor 24 is bent over the outer insulation of the cable as shown. The resulting thermistor assembly is then inserted into casing 22 via the larger portion 27 of the bore, and tapered portion 29 of the casing bore guides the thermistor into proper position. Solder joint 32, Fig. 2, is then made, and the casing is crimped at 34 to cable 23, thus assuring contact between portion 24a of conductor 24 and casing 22, and completing the assembly.

The provision of adequate transfer of heat from the battery electrolyte, when the unit just described is inserted in a storage battery, is of particular importance since there is a tendency for heat to be conducted away from the thermistor by conductors 24 and 25. In this connection, it will be noted that the end 30 of the thermistor is exposed for direct contact with the battery electrolyte. Further, the thermistor is positioned immediately adjacent the relatively thicker portion of the casing 22, and heat collected by this portion of the casing is readily transferred to the thermistor by the solder joint 32. As will be clear from Fig. 4, hereinafter described, when the unit is inserted in the battery, both the end 31 of the casing and the end 30 of the thermistor are in direct contact with the battery electrolyte. Thus, heat from the electrolyte is transferred to the thermistor both by direct contact and through the relatively thick end portion of the casing. Further, when the unit is so inserted in the battery, the casing and the thermistor are in electrical contact with the electrolyte, so that the circuit comprising conductors 24 and 25 is connected to the electrolyte. Therefore, the unit can be employed with battery charger safety circuits of the type disclosed in co-pending application, Serial Number 97,772, filed June 8, 1949, by Lewis A. Medlar, now Patent 2,499,663.

The two embodiments of the invention shown in Figs. 1-3 and just described appear in the aforementioned application, Serial Number 87,494. I have found that, when the units shown in Figs. 1-3 are used in actual practice to control a battery charger, it is highly desirable to provide some means for reducing heat transfer between the thermally responsive resistance unit and the air surrounding the storage battery in which the unit is inserted. When the thermally responsive units are employed to control a battery charger, it is necessary that the thermistor be substantially at the temperature of the electrolyte of the battery being charged. If the air surrounding the battery is at a low temperature, there is a decided tendency for heat to be conducted away from the thermistor by the casing, since the casing usually extends above the top of the battery.

I therefore provide a continuous sheath of heat-insulating material completely covering the casing, except for the tip thereof. Fig. 4 illustrates the unit previously described with reference to Fig. 2, with such a sheath applied thereto. Here, it will be seen that the sheath 35 extends from a point 36 on the cable 23 continuously along the outer surface of the casing 22 for most of its length. The sheath 35 may be of any suitable insulating material and may be applied in various conventional manners well known in the art. I find it expedient to employ as the sheath 35 a tube of vinyl plastic and to apply the tube to the unit by shrinking the tube over the casing and cable, so that the resulting sheath follows closely the contour of the unit, as shown.

The material of the sheath 35, in addition to having sufficient heat insulating properties, should of course be sufficiently resistant to chemical attack by the battery electrolyte. Typical examples of suitable materials for the sheath include such vinyl plastics as the vinyl-chloride acetates, the vinyl chlorides, the vinyl-butyl resins, the polyethylenes, the chlorinated rubbers, synthetic and natural rubbers, and similar materials.

In Fig. 4, the dotted lines at C and E indicate the positions of the battery cover and electrolyte, respectively, relative to the unit when the unit is inserted in the battery. It will thus be seen that, while heat may flow directly from the electrolyte to the thermistor, presence of the sheath 35 prevents loss of heat along the casing to the air outside of the battery. The tip of the casing, indicated at 22ª, will normally be completely covered by the battery electrolyte, as shown, when the unit is in place in the battery.

In the embodiment of the invention shown in Fig. 2, I prefer to employ as the thermistor element 21 a molded and fired rod-like body of semi-conductive metal oxides, as in the case of thermistor element 1, Fig. 1. Such thermistors are well known in the art and are particularly well adapted for battery charger control applications because of their resistance characteristics and high mechanical strength.

While the embodiment of the invention illustrated in Fig. 1 is advantageous in that the thermistor element, being supported out of contact with the casing by means of conductors 4 and 5, is resiliently mounted, this embodiment can not be used where it is necessary to bring the thermistor into direct contact with the battery electrolyte. I have found that the strucure shown in Fig. 2, wherein the termistor element is secured at one end directly to the casing by means of a relatively massive solder joint and is brought into direct contact with the electrolyte when the unit is inserted in the battery, also provides great resistance to mechanical shock. Though, in this latter embodiment of the invention, mechanical shocks applied to the casing are necessarily transmitted directly to the thermistor element, the element is rigidly supported at one end and, since the element is relatively short, the end thereof connected to conductor 25 is not liable to any serious mechanical displacement. Also, it is preferable that the insulating sleeve 33 which surrounds the free end of the thermistor element be of sufficient thickness to substantially fill the space between the thermistor element and the inner wall of the casing.

I claim:

1. A thermally sensitive resistance unit adapted to be subjected to the internal temperature of a storage battery by being inserted through a filling opening in the battery casing, comprising an electrical cable including two conductors and a relatively thick insulating sheath, a generally tubular electrically conductive casing having a bore therethrough, one end of said casing being secured in fluid tight relation over an end of said insulating sheath, and a generally rod-like thermally sensitive resistance element positioned in the bore of said casing and having one end electrically connected to said casing by a solder joint, said solder joint closing said bore to prevent entrance of liquid, one of said conductors being connected to the remaining end of said resistance element, and the other of said conductors being connected to said casing.

2. A thermally responsive resistance unit adapted to be subjected to the internal temperature of a storage battery by being inserted through a filling opening in the battery casing, comprising an electrical cable including two conductors and a relatively thick insulating sheath, a generally rod-like thermally responsive resistance element, and a tubular casing having a bore therethrough, said casing comprising a portion of relatively large internal diameter at one end and a portion of relatively smaller internal diameter at the opposite end, said resistance element being positioned within and closely spaced from the portion of said casing of smaller internal diameter, one end of said resistance element being electrically connected to said casing by a solder joint, said solder joint closing said bore to the entrance of liquid, the remaining end of said resistance element being connected to one conductor of said cable, the other conductor of said cable being bared for a portion of its length and being bent back so as to extend along the outer surface of said sheath, and said casing being tightly secured, at the end thereof removed from said solder joint, over the end of said sheath and the bared portion of said second conductor extending along the outer surface of said sheath.

3. A thermally responsive resistance unit comprising an electrical cable including two conductors and a relatively thick insulating sheath, an electrically conductive tubular casing, and a rod-like thermally responsive resistance element; said casing having a bore including a portion of relatively large internal diameter at one end, a portion of relatively smaller internal diameter at the opposite end, and a tapered portion connecting said large and smaller portions; said resistance element having a diameter less than the internal diameter of the smaller portion of said bore and being located concentrically within said smaller portion of said bore with one end of said element flush with the end of said casing, said resistance element being supported within and electrically connected to said casing by a solder joint at one end of said resistance element said solder joint completely sealing the space between said element and said casing against entrance of liquid; the other end of said resistance element being connected to one of the conductors of said cable; the other conductor of said cable being bent back to extend along the outer surface of the insulating sheath of said cable, and the portion of said casing of larger internal diameter being tightly secured over the insulating sheath of said cable with the said bent back conductor portion being held in electrical contact with the inner surface of said casing by said insulating sheath.

4. A thermally responsive resistance unit adapted to be subjected to the internal temperature of a storage battery by being inserted through a filling opening in the battery casing, comprising an electrical cable including two conductors and a relatively thick insulating sheath; a generally tubular casing of good heat conductive material, said generally tubular casing being secured over the insulating sheath of said cable and including a portion extending beyond the end of said sheath and terminating in a tip closed against entrance of liquid; a thermally responsive resistance element positioned within said casing adjacent said tip, the two conductors of said cable being electrically connected to opposite ends of said resistance element, and a continuous heat insulating sheath completely covering the connection between said casing and the sheath of said cable and extending substantially to the tip of said casing.

5. A thermally responsive resistance unit adapted to be subjected to the internal temperature of a storage battery by being inserted through a filling opening in the battery casing, comprising an electrical cable including two conductors and a relatively thick insulating sheath; a generally tubular casing of good heat conductive material, said casing being secured over the insulating sheath of said cable and including a portion extending to a tip spaced from the end of said sheath; a rod-like thermally responsive resistance element positioned concentrically within said casing and extending to the tip thereof; a solder joint electrically connecting said resistance element to said casing at the end of said element located at the tip of said casing, said solder joint sealing the space between said casing tip and said resistance element against entrance of liquid, one of said conductors of said cable being connected to the end of said resistance element opposite said solder joint and the other of said conductors of said cable being electrically connected to said casing, and a heat insulating sheath extending continuously from a point on the exterior surface of said cable substantially to the tip of said casing.

LEWIS A. MEDLAR.

REFERENCES CITED

The following references are of record in the file of this patent:

UNITED STATES PATENTS

| Number | Name | Date |
|---|---|---|
| 2,102,030 | Quereau | Dec. 14, 1937 |
| 2,216,375 | Minter | Oct. 1, 1940 |
| 2,321,846 | Obermaier | June 15, 1943 |
| 2,379,530 | Lederer | July 3, 1945 |